(12) United States Patent
Iwase et al.

(10) Patent No.: US 6,552,999 B2
(45) Date of Patent: *Apr. 22, 2003

(54) ASYNCHRONOUS TRANSFER MODE NETWORK PROVIDING STABLE CONNECTION QUALITY

(75) Inventors: Toshio Iwase, Tokyo (JP); Shinichi Nakajima, Tokyo (JP); Kisaku Fujimoto, Tokyo (JP); Hisazumi Tsuchida, Kanagawa (JP)

(73) Assignees: NEC Corp. (JP); Nippon Telegraph and Telephone Corp. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,530

(22) Filed: Sep. 5, 1997

(65) Prior Publication Data

US 2002/0075800 A1 Jun. 20, 2002

(30) Foreign Application Priority Data

Sep. 6, 1996 (JP) .............................. 8-236362

(51) Int. Cl.$^7$ .......................... H04L 12/26; H04L 12/56
(52) U.S. Cl. ................... 370/230; 370/395.2
(58) Field of Search ............................. 370/229, 230, 370/231, 232, 233, 234, 235, 236, 252, 253, 254, 468; 709/232, 235, 225, 240

(56) References Cited

U.S. PATENT DOCUMENTS

| | | | | |
|---|---|---|---|---|
| 5,132,966 A | * | 7/1992 | Hayano | 370/233 |
| 5,258,979 A | * | 11/1993 | Oomuro et al. | 370/468 |
| 5,414,697 A | * | 5/1995 | Osaki | 370/468 |
| 5,519,689 A | * | 5/1996 | Kim | 370/230 |
| 5,521,971 A | * | 5/1996 | Key et al. | 370/229 |
| 5,583,857 A | * | 12/1996 | Soumiya | 370/233 |
| 5,687,167 A | * | 11/1997 | Bertin et al. | 370/254 |
| 5,784,358 A | * | 7/1998 | Smith et al. | 370/230 |

FOREIGN PATENT DOCUMENTS

CA          2184830         9/1995

(List continued on next page.)

OTHER PUBLICATIONS

Bolla, R., et al., "An Integrated Dynamic Resource Allocation Scheme for ATM Networks" Foundation for the Future, San Francisco, Mar. 28, 1993, vol. 3, No. Conf. 12, pp. 1288–1297 (6 pgs.).

(List continued on next page.)

Primary Examiner—Steven Nguyen
(74) Attorney, Agent, or Firm—Dickstein, Shapiro, Morin & Oshinsky, LLP

(57) ABSTRACT

In an asynchronous transfer mode network (401), a network controller (404) is connected to terminal equipment units (406) through logic transmission line circuits (408) so as to receive a call signal which includes a parameter representative of a network class and which is produced by one of the terminal equipment units. Each of the terminal equipment units is connected to one of ATM exchangers (402) each of which is connected to at least one of them. The control network controller is connected to the ATM exchangers through logic transmission line circuits (405) so as to order them to admit a connection required by the call signal.

4 Claims, 8 Drawing Sheets

FOREIGN PATENT DOCUMENTS

| | | |
|---|---|---|
| EP | 0388951 | 9/1990 |
| EP | 0673138 | 9/1995 |
| JP | 2-250451 | 10/1990 |
| JP | 3-58646 | 3/1991 |
| JP | 3-101440 | 4/1991 |
| JP | 7-264190 | 10/1995 |
| JP | 8-181701 | 7/1996 |

OTHER PUBLICATIONS

Japanese Office Action dated Jun. 26, 2002 (w/ English translation of relevant portions).

Kenji Tsunekawa et al., "An Automatic Circuit Setting system in the ATM PVC Networks," 1996 Grand Meeting of the Electronic Information and Communications Society B–858, Aug. 30, 1996.

Jun Iwata et al., "The QOS Routing System in the ATM Network," Technical Research Report SSE 95–126, Electronic and Communications Society, Dec. 8, 1995.

* cited by examiner

205

| CONNECTION ID | CONNECTION ROUTE | CONNECTION PRIORITY |
|---|---|---|
| CONNECTION A | EX 201.202 | LOW |
| CONNECTION B | EX 201.203 | HIGH |
| CONNECTION C | EX 202.203 | HIGH |
| CONNECTION D | EX 202.203 | LOW |

FIG. 3 PRIOR ART

| NETWORK CLASS | PRIORITY | FEE | ARRANGEMENT WHEN NECESSARY BANDWIDTH IS WIDER THAN EMPTY BANDWIDTH | |
|---|---|---|---|---|
| | | | NEW CONNECTION | EXISTING CONNECTION |
| PREFERENTIAL CONNECTION | HIGH ↕ LOW | HIGH ↕ LOW | RELEASE UNPREFERENTIAL CONNECTION AND SECURE NECESSARY BANDWIDTH | NO INFLUENCE OF NEW CONNECTION |
| NORMAL CONNECTION | | | IMPOSSIBLE TO SECURE NECESSARY BANDWIDTH | NO INFLUENCE OF NEW CONNECTION |
| UNPREFERENTIAL CONNECTION | | | IMPOSSIBLE TO SECURE NECESSARY BANDWIDTH | POSSIBLE TO BE RELEASED BY NEW CONNECTION WITH PREFERENTIAL CONNECTION |

FIG. 6

ASYNCHRONOUS TRANSFER MODE NETWORK PROVIDING STABLE CONNECTION QUALITY

BACKGROUND OF THE INVENTION

This invention relates to an asynchronous transfer mode (ATM) network having a network controller which controls quality of connections in the ATM network.

An ATM network of a specific type has a plurality of ATM exchangers each of which is connected to at least one of the other exchangers and to a plurality of terminal equipment units. A network controller is connected to all of the exchangers so as to control admitting and releasing connections between the terminal equipment units.

The network controller prevents or solves congestion of traffic on connections at each of the exchangers so as to keep predetermined quality of the connections.

When the network controller receives a call from one of the terminal equipment units, the network controller decides whether or not an empty bandwidth exists which is wide enough for admission of a new connection required by the call. Namely, the network controller decides whether or not the congestion is caused to occur by the admission of the new connection.

If the empty bandwidth is not wide enough, the network controller operates according to priority of the new connection. Specifically, the network controller searches connections which do not have priority over the new connection from existing connections. Then, the network controller, for example, disconnects one or more of searched connections to admit the new connection. Moreover, there is another case that the network controller limits a bandwidth of one of the searched connections so as to admit the new connection. In addition, there is still another case that the network controller discards cells which are transmitted through one of the searched connections so as to admit the new connection.

When the congestion occurs at some of the ATM exchangers, the network controller searches connections which have the lowest priority among the existing connections. Then, the network controller regulates one of the searched connections in the manner mentioned above to prevent the congestion.

Therefore, each of the existing connections is not always secured until an end of transmission in the specific type ATM network.

In addition, the bandwidth of each connection is decided by the network controller.

Therefore, the new connection is not always given the bandwidth requested by the call signal.

SUMMARY OF THE INVENTION

It is therefore an object of this invention to provide an ATM network which enables designation of a bandwidth from a terminal equipment.

It is therefore another object of this invention to provide an ATM network oaf the type described which keeps a bandwidth stable until an end of transmission.

It is therefore still another object of this invention to provide an ATM network of the type described which accomplishes stable connection quality.

Other objects of this invention will become clear as the description proceeds.

In order to understand the gist of this invention, it should be noted that an asynchronous transfer mode network has an exchange, which is connected to a plurality of terminal equipment units, for admitting a connection in response to a call signal sent from one of the terminal equipment units.

According to an aspect of this invention, the asynchronous transfer mode network comprises a network controller which is connected to both the exchange and to the terminal equipment units by logic transmission line circuits for receiving the call signal and for judging whether or not the connection can be admitted in the asynchronous transfer mode network to order the exchange to admit the connection.

BRIEF DESCRIPTION OF THE DRAWING

FIG. 3 is a connection attribute table which is referred by an network controller used in the conventional ATM network of FIG. 2;

FIG. 6 is a table for use in describing a network class;

DESCRIPTION OF THE PREFERRED EMBODIMENTS

Figure 1:
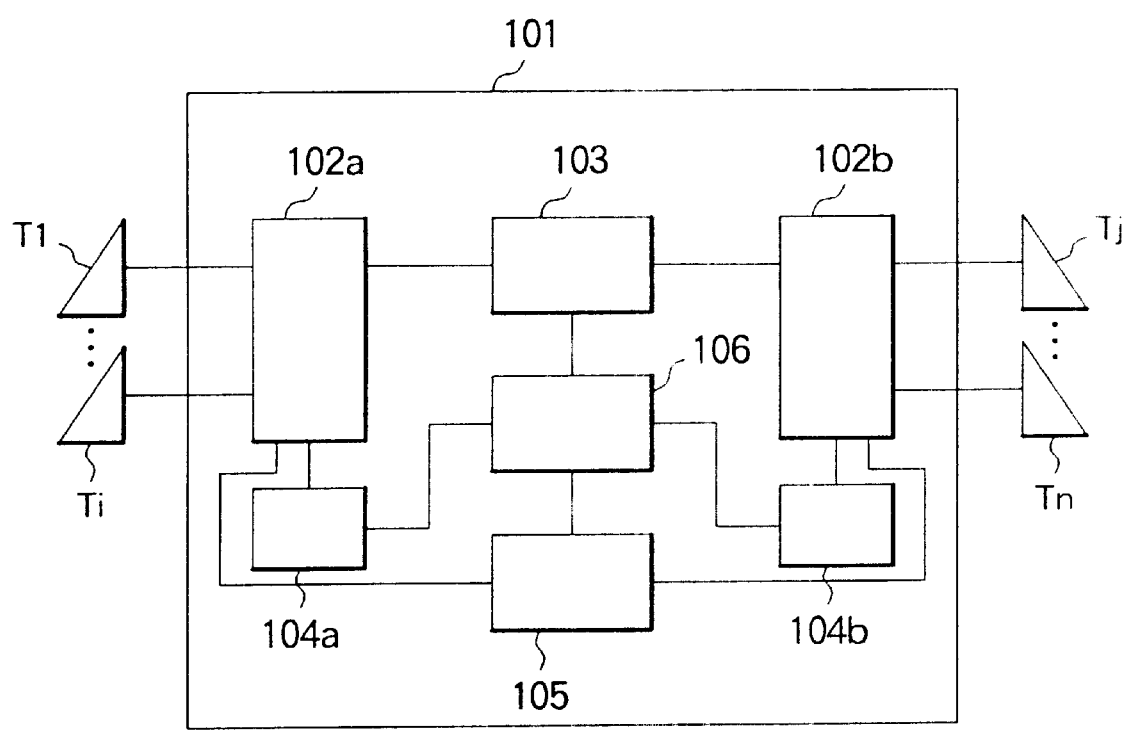
FIG. 1 is a block diagram of a specific one of conventional ATM networks.

Referring to FIG. 1, description will be at first directed to a conventional ATM network for a better understanding of this invention.

In FIG. 1, a conventional ATM network 101 of a specific type has cell assemble and disassemble sections 102*a* and 102*b* which are connected to terminal equipment units T1–Ti and Tj–Tn, respectively. An ATM transmission path 103 is connected between the cell assemble and disassemble sections 102*a* and 102*b*. Band width limiting sections 104*a* and 104*b* are connected to the cell assemble and disassemble sections 102*a* and 102*b*, respectively. A call control section 105 is connected to both of the cell assemble and disassemble sections 102*a* and 102*b*. A bandwidth managing section 106 is connected to the bandwidth limiting sections 104*a* and 104*b* and the call control section 105.

The conventional ATM network 101 admits a new connection which has priority over existing connections even when an empty bandwidth is not wide enough. Operation of the conventional ATM network 101 will be described soon.

Each of the terminal equipment units T1–Ti and Tj–Tn issues a call when a request is made about admission of a connection between itself and one of the other terminal equipment units. In this event, the terminal equipment which makes the call sends cells to the call control section 105 through the cell assemble and disassemble section 102*a* or 102*b*. Each cell includes own and the other's attribute data and predetermined parameters.

The call control section 105 decides priority of the new connection and a necessary bandwidth for the new connection in response to the attribute data and the parameters included in the cells and reports the priority and the necessary bandwidth to the bandwidth managing section 106.

The bandwidth managing section 106 judges whether or not the new connection can be admitted in the ATM transmission path 103. In other words, judgment is made in the bandwidth managing section 106 about whether or not the ATM transmission path 103 has the empty bandwidth which is wider than the necessary bandwidth of the new connection. If the ATM transmission path 103 has the empty bandwidth wider than the necessary bandwidth, the bandwidth managing section 106 assigns the empty bandwidth to the new connection. As a result, the new connection is admitted in the conventional ATM network and is established in the ATM transmission path 103.

On the other hand, if the ATM transmission path 103 does not have the empty bandwidth which is wider than the necessary bandwidth, the bandwidth managing section 106 searches existing connections each of which does not have priority over the new connection and has a wide bandwidth wider than the necessary bandwidth. The band width managing section 106 selects one from the searched existing connections. Then, the bandwidth managing section 106 deprive a part or all of the wide bandwidth of one of the existing connections to assign the new connection. Consequently, the new connection is established in the ATM transmission path 103.

Therefore, the conventional ATM network 101 allows that the new connection having higher priority is preferentially established in the ATM transmission path 103.

However, there is possibility that each of the existing connections is regulated by admission of the new connection in the conventional ATM network.

Moreover, the bandwidth of each connection is assigned by the bandwidth managing section 106 and can not be designated from each of the terminal terminal equipment units T1–Ti and Tj–Tn.

Such a conventional ATM network is disclosed in an Unexamined Japanese Patent Publication 101440/1991.

Figure 2:
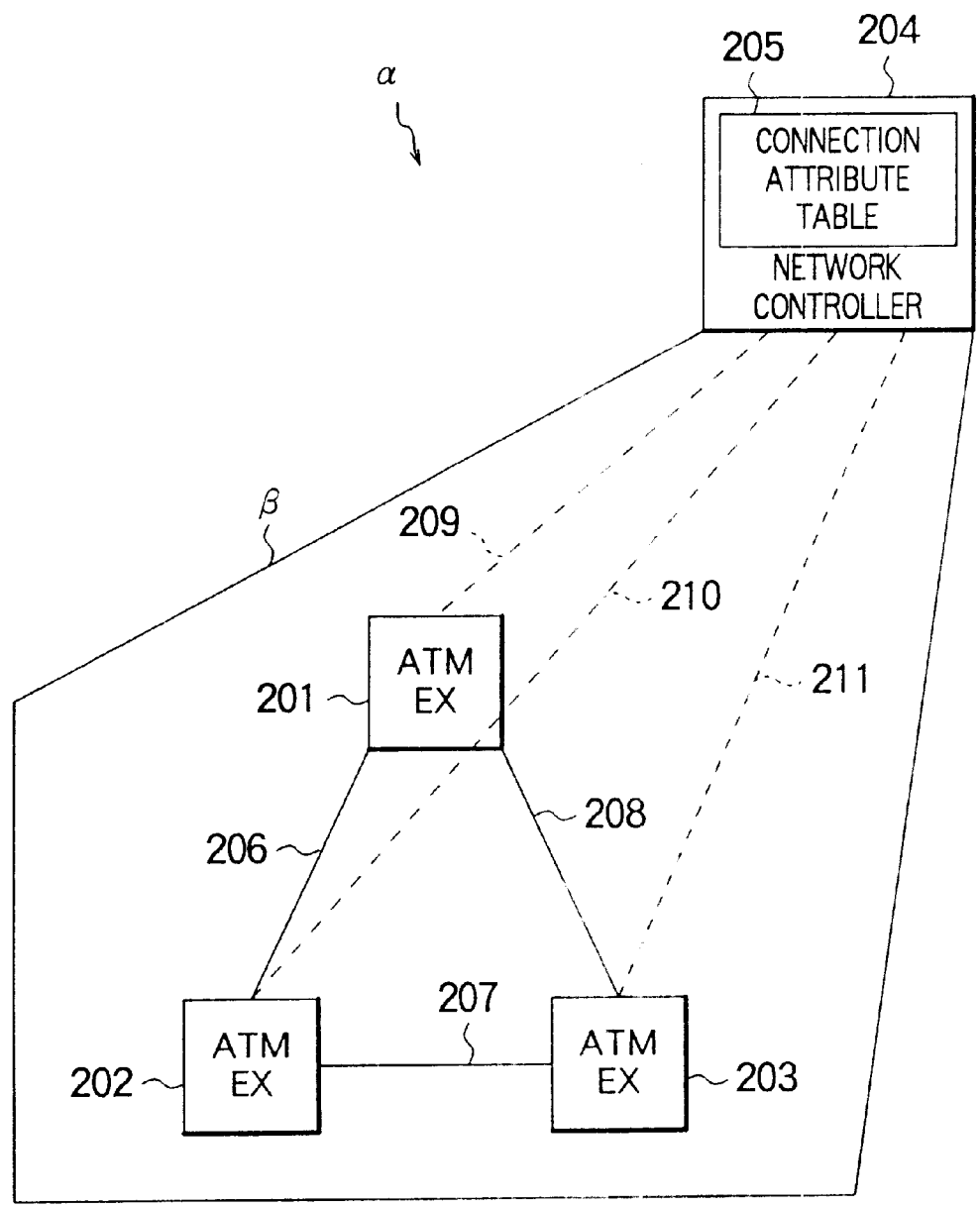
FIG. 2 is a block diagram of a specific one of other conventional ATM networks.

Referring to FIG. 2, description will be made about another conventional ATM network of another specific type.

In FIG. 2, an ATM network a has ATM exchangers 201, 202, and 203 and network controller 204 which has a control area β including the ATM exchangers 201, 202, and 203 and which has a connection attribute table 205. The ATM exchangers 201, 20,2, and 203 located within the control area will be collectively called an exchange section.

The ATM exchangers 201, 202, and 203 are connected to one another by physical transmission line circuits 206, 207, and 208 and are connected to the network controller 204 by logical transmission line circuits 206, 207, and 208, respectively.

In this structure, the ATM exchangers 201, 202, and 203 report occurrence of congestion of traffic therein to the network controller 204. If the network controller 204 receives the report from one of the ATM exchangers 201, 202, and 203, it searches a connection having the lowest priority among existing connections passing through the ATM exchangers with reference to the connection attribute table 205. If such a connection of the lowest priority is present, the network controller 204 orders the ATM exchanger to abandon cells related to the lowest priority connection. As a result, traffic is regulated and the congestion is solved in the ATM exchanger.

For example, it is assumed that the connection attribute table 205 has contents as shown in FIG. 3 and that the congestion of traffic occurs at the ATM exchanger 201. In this situation, the ATM exchanger 201 reports the occurrence of the congestion to the network controller 204 through the logic transmission line circuit 209. The network controller 204 looks up connections A and B which pass through the ATM exchanger 201 and selects the connection A of lower priority with reference to the connection attribute table 205. Then, the network controller 204 orders the ATM exchangers 201 and 202 which are concerned with the connection A to partly or wholly abandon cells on the connection A or to disconnect the connection A. Therefore, the congestion is solved in the conventional ATM network.

However, each of the connections may be regulated by occurrence of the congestion. In the worst case, each connection is released from the conventional ATM network α.

Such a conventional ATM network is disclosed in an Unexamined Japanese Patent Publication 261061/1994.

Referring to FIGS. 4 to 8, description will proceed to an synchronous transfer mode (ATM) network according to a first embodiment of this invention.

Figure 4:
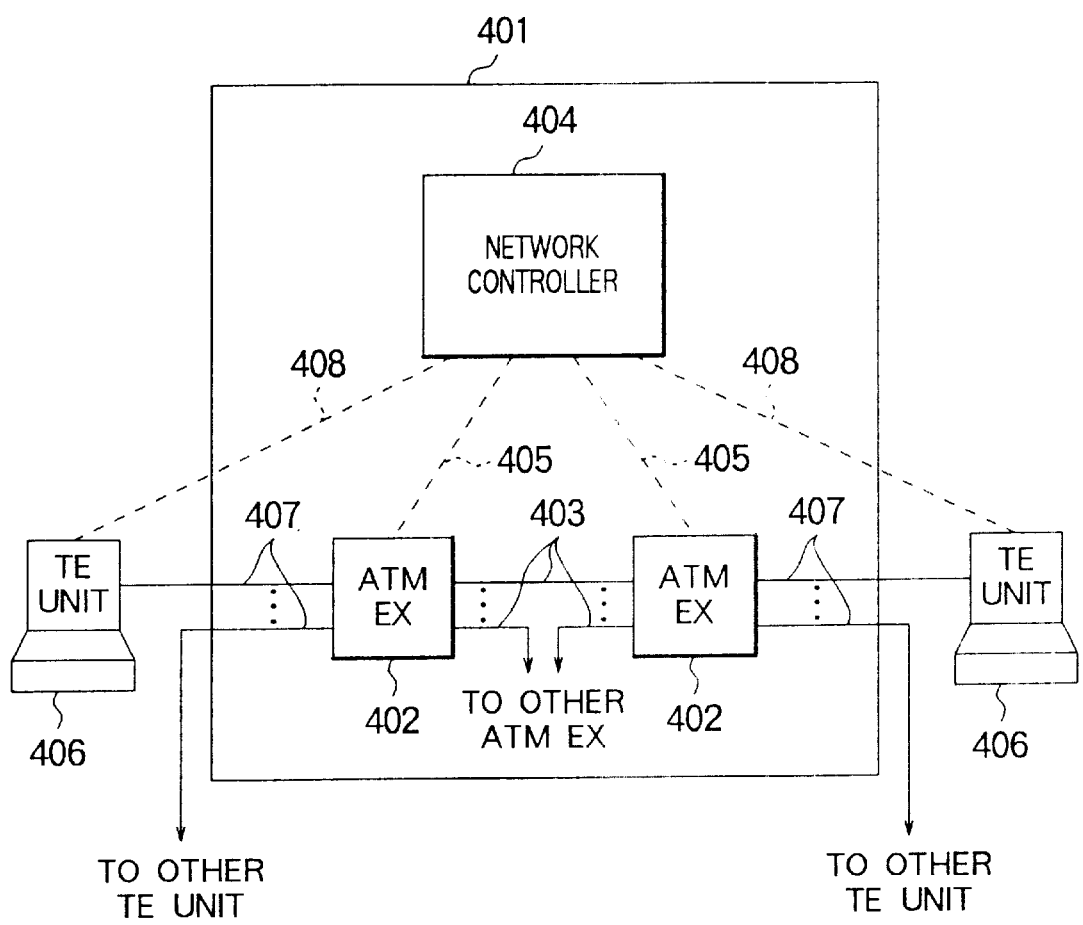
FIG. 4 is a block diagram of an ATM network according to a first embodiment of this invention.

In FIG. 4, the ATM network 401 comprises a plurality of ATM network exchangers 402 each of which is connected to at least one of the others by ATM line circuits 403. A network controller 404 is connected to the ATM network exchangers 402 through logic transmission line circuits 405. Each of the logic transmission line circuits 405 may be an ATM line circuit, another exclusive line circuit, etc.

A plurality of terminal equipment units 406 are connected to the ATM network 401. Each of the terminal equipment units 406 is connected to one of the ATM exchangers 402 by ATM line circuits 407 and connected to the network controller 404 through logic transmission line circuits 408. Each of the ATM line circuits 407 may not be always connected to the terminal equipment units 406 directly. For example, each of the ATM line circuits 407 may be connected to a network termination apparatus (not shown), such as an ATM router, which is connected to the terminal equipment units 406 through another line circuits (not shown). Moreover, each of the logic transmission line circuits 408 may be an ATM line circuit, another exclusive line circuit, etc.

Figure 5:
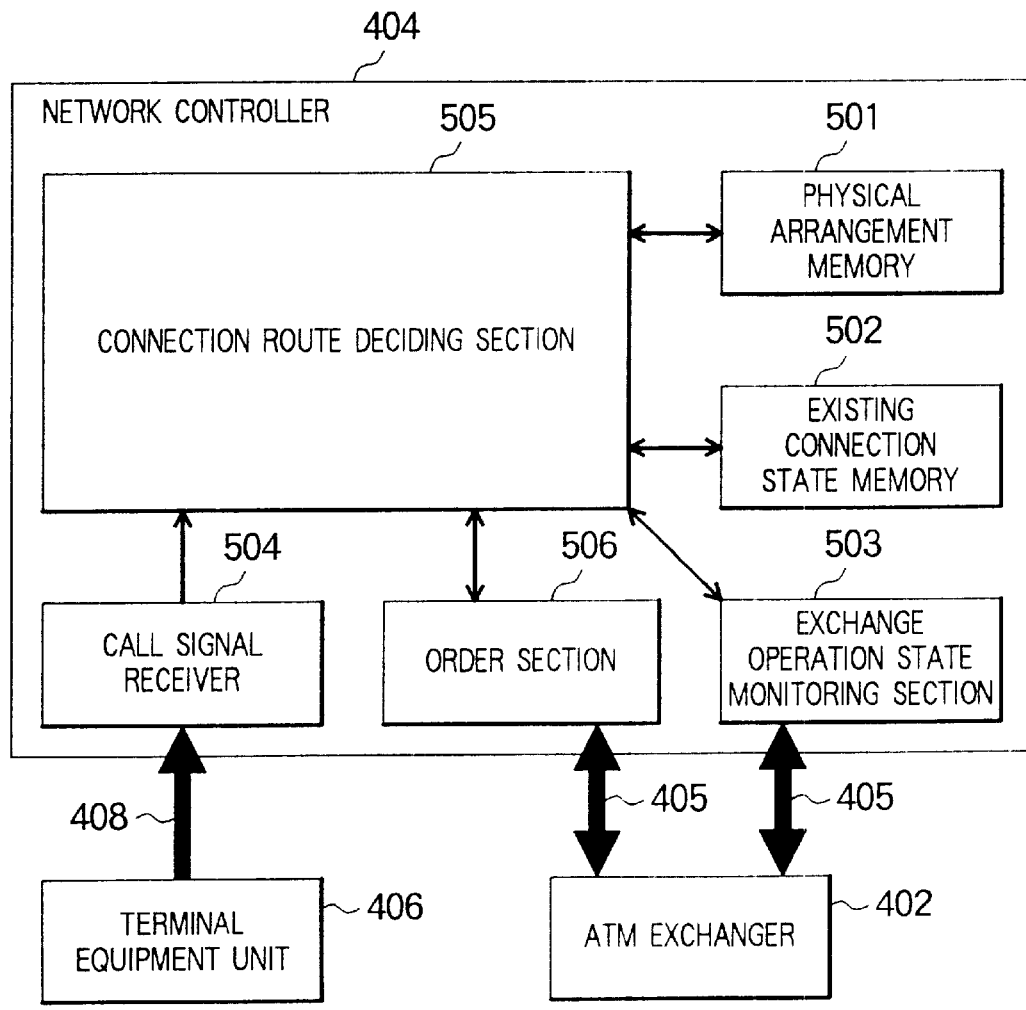
FIG. 5 is a block diagram of a network controller used in the ATM network of FIG. 4.

In FIG. 5, the network controller 404 has a physical arrangement memory 501 which memorizes physical arrangement information representative of physical arrangement of the ATM exchangers 402 and the terminal equipment units 406. An existing connection state memory 502 memorizes existing connection state information which includes items of a route, a bandwidth, a network class, etc. concerning each of existing connections.

An exchanger operation state monitoring section 503 monitors an operation state of each ATM exchanger 402 through the logic transmission line circuits 405. A call signal receiver 504 receives a call signal sent from each terminal equipment unit 406 through the logic transmission line circuits 408. The call signal requests the network controller 404 to admit a new connection. A connection route deciding section 505 is connected to the physical arrangement memory 501, the existing connection state memory 502, the exchanger operation state monitoring section 503, and the call signal receiver 504. The connection route deciding section 505 decides a route of the new connection in response to the call signal with reference to the physical arrangement information, the exchanger operation state, and existing connection state information. In consequence, the connection route deciding section 505 produces an admission signal which is representative of the route. A ordering section 506 is connected to the connection route deciding section 505 and orders the ATM exchangers 402 arranged on the route to admit the new connection in response to the admission signal. The ordering section 506 reports admission of the new connection to the existing connection state memory 502 and the terminal equipment units 406 concerning to the new connection.

Operation of the network controller 404 will be described below.

Each of the terminal equipment units 406 has a connection request section (not shown) which produces the call signal to request the network controller 404 to admit the new connection in the ATM network 401. The call signal has a parameter which includes an address of a destination terminal equipment unit, a necessary bandwidth of the new connection, and a network class of the new connection. The call signal may include connection route data. However, the following description will be made on the assumption that the call signal includes no connection route data.

The network class is classified into three classes or levels as illustrated in FIG. 6. One of the classes is a preferential connection class while another one is a normal connection class and the remaining one is an unpreferential connection class. From this fact, it is to be noted that the normal connection class is defined in the example illustrated.

A first connection concerned with the unpreferential connection class is admitted into the ATM network 401 when an empty bandwidth is wider than the necessary bandwidth. However, the first connection can be forcibly released by the network controller 404 so that a second connection concerned with the preferential connection class is admitted into the ATM network 401.

The second connection is admitted into the ATM network 401 when the empty bandwidth is wider than the necessary bandwidth or when the empty bandwidth becomes wider than the necessary bandwidth by releasing the first connection. The second connection is kept intact with a bandwidth held until the end.

A third connection concerned with the normal connection class is admitted into the ATM network 401 when the empty bandwidth is wider than the necessary bandwidth. The third connection is kept intact with a bandwidth held until the end like the second connection.

Thus, the network class shows priority of the connection. In addition, it is noted that fees for the connections mentioned above become high as the priority becomes high. Accordingly, even if the fees are pertinently determined, consideration should be made about desirable ratios of preferential connection, normal connection, and unpreferential connection so as to appropriately distribute each connection.

Figure 7:
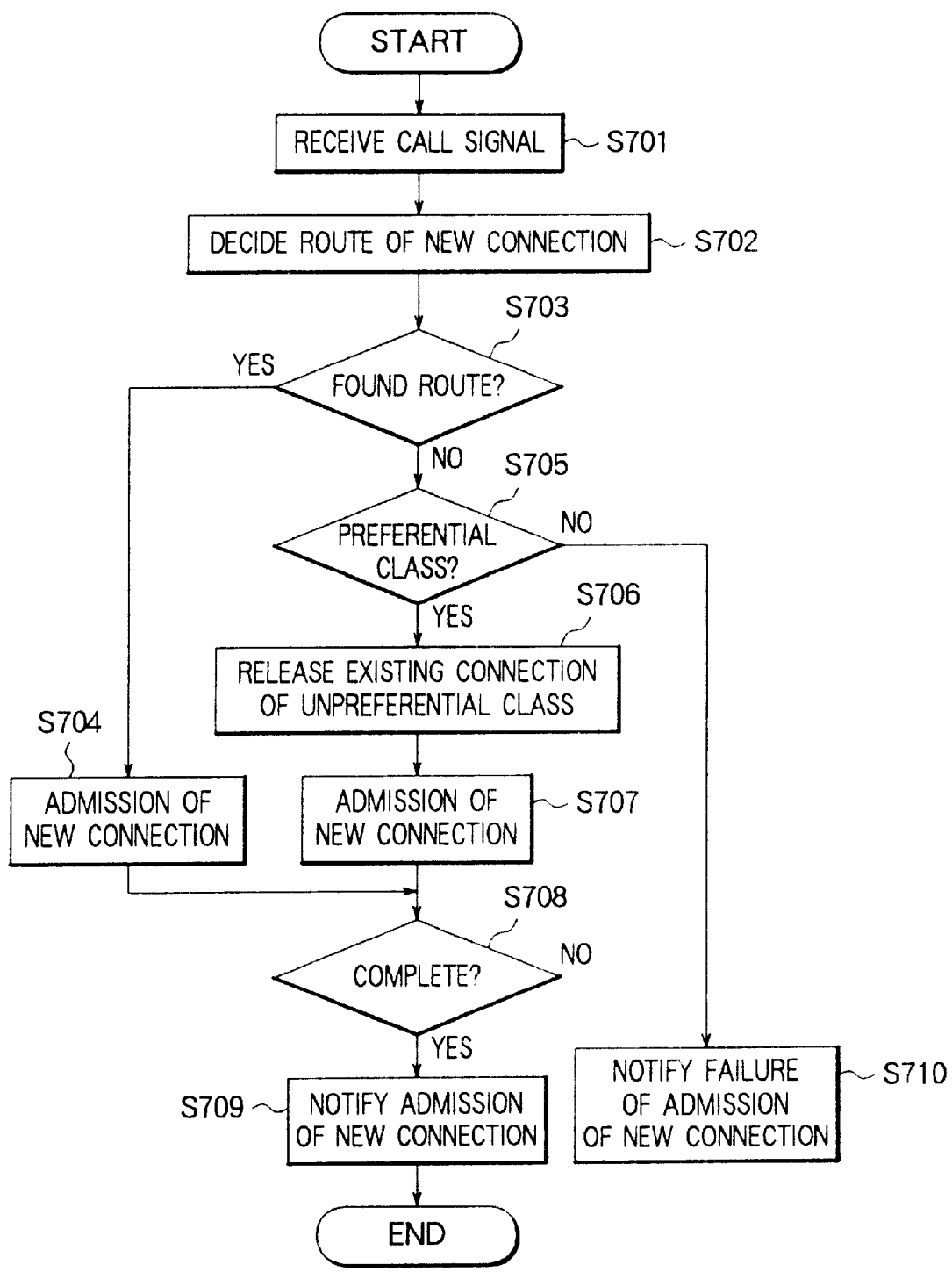
FIG. 7 is a flow chart for use in describing operation of a network controller used in the ATM network of FIG. 4.

The network controller 404 operates in the manner illustrated in FIG. 7.

First, the call signal receiver 504 receives the call signal sent from one of the terminal equipment units 406 (Step S701). The call signal receiver 504 reports the receipt of the call signal and sends the parameter included in the call signal to the connection route deciding section 505.

The connection route deciding section 505 has routing data concerning each of the terminal equipment units 406 so as to decide the route in response to the parameter at the step S702. The routing data include a plurality of optional routes which are given priority and which corresponds to the new connection. The connection route deciding section 505 selects one from the optional routes according to the priority and judges with reference to the physical arrangement information and the existing connection state information whether or not the selected optional route includes the empty bandwidth wider than the necessary bandwidth. At this time, the connection route deciding section 505 also judges whether or not a fault occurs at the ATM exchangers 402 arranged on the selected optional routes. The connection route deciding section 505 repeats this operation until it finds an optimum route which has the empty bandwidth wider than the necessary bandwidth and which does not pass through the faulty ATM exchanger 402. Moreover, the connection route deciding section 505 stops the operation when the optimum route is not found from the optional routes.

Finding the optimum route at the step S702, the connection route deciding section 505 judges that the new connection can be admitted in the ATM network 401 at the step S703. Then, the connection route deciding section 505 notifies the ordering section 506 of the optimum route together with the necessary bandwidth.

The ordering section 506 orders the ATM exchangers 402 arranged on the optimum route to admit the new connection with the necessary bandwidth (Step S704).

On the other hand, when the optimum route is not found at the step S702, the connection route deciding section 505 judges that the new connection can not be admitted in the ATM network 401 at the step S703. Then, the connection route deciding section 505 confirms the network class which is included in the parameter (Step S705).

If the network class confirmed differs from the preferential network class, the step S705 jumps to the step S710.

If the network class is identical with the preferential network class, the connection route deciding section 505 directs the ordering section 506 to release the existing connections of the unpreferential network class. Herein, it is assumed that the existing connections of the unpreferential network class are established through various combinations of the ATM exchangers 402 which will be called specific ATM exchangers herein under.

If the specific ATM exchangers 402 are all which are arranged on the optional routes, the network controller 404 operates in the following manner.

The ordering section 506 orders the specific ATM exchangers 402 to release the existing connections of the unpreferential network class in response to a direction or command supplied from the connection route deciding section 505.

The specific ATM exchangers 402 release all of the existing connections of the unpreferential network class in response to an order supplied from the ordering section 506 (Step S706). In this state, the existing connection state information is renewed.

On the other hand, when the connection route deciding section 505 selects one from the optional routes according to the priority, it is presumed that the specific ATM exchangers 402 are all arranged on the selected one of the optional routes. In this case, additional steps (not shown) like the step S702 and S703 are carried out. If the optimum route is not found in the additional steps, the step S706 and the additional steps are repeated until the optimum route is found or all of the optional routes are selected by the connection route deciding section 505.

Moreover, the connection route deciding section 505 may select one of the optional routes that will have an empty bandwidth wider than the necessary bandwidth by releasing the connection of unpreferential class.

Next, the connection route deciding section 505 searches the optimum route from the optional routes like the step S702 and notifies the ordering section 506 of the searched optimum route. However, in case that the optional route is selected so as tog release the connections of the unpreferential network class, the connection route deciding section 505 notifies the ordering section 506 of the selected route which will have empty bandwidth wider than the necessary bandwidth.

The ordering section 506 orders the ATM exchangers 402 arranged on the optimum route to admit the new connection. Each of the ATM exchangers 402 admits the new connection in response to the order of the ordering section 506 (Step S707). Then, the ATM exchangers 402 report the result of the admitting operation to the ordering section 506.

The ordering section 506 renews the existing connection state information of the existing connection state memory 502 through the connection route deciding section 505, when the result shows that the new connection is admitted into the ATM network 401 (Step S708). Moreover, the ordering section 506 notifies the terminal equipment unit 406 produces the call signal of completion of admission of the new connection (Step S709).

When the result shows that the new connection is not admitted into the ATM network 401, the ordering section 506 notifies failure of admission of the new connection to the terminal equipment unit 406 which produce the call signal (Step S710).

Figure 8:
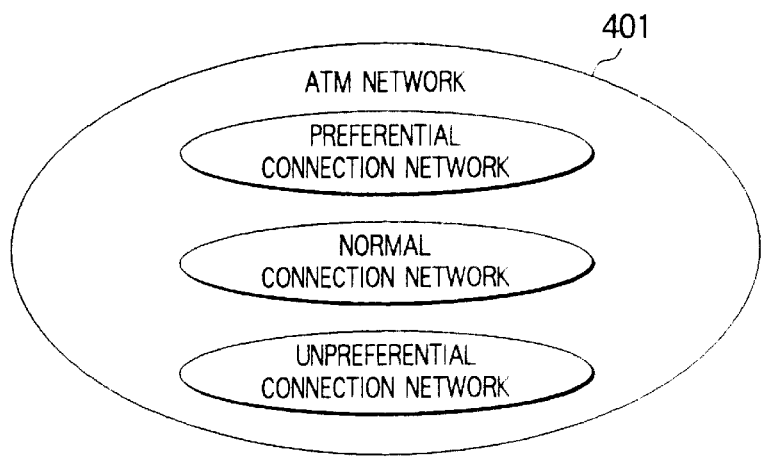
FIG. 8 shows a conception of the ATM network of FIG. 4.

As mentioned above, the network controller 404 controls the new connection and the existing connection in response to the call signal. Accordingly, if the call signal includes the network class which indicative of the preferential network class, admission probability of the new connection is high under a situation of bandwidth insufficiency. Moreover, if the call signal includes the network class which is indicative of the normal network class, the bandwidth of the new connection admitted into the ATM network 401 is kept intact until the end. In addition, if the call signal includes the network class which is indicative of the unpreferential network class, the fee is suppressed although the new connection may be forcibly released. Therefore, the ATM network system seems to form three networks which have quality of service levels different from one another as shown in FIG. 8.

Figure 9:
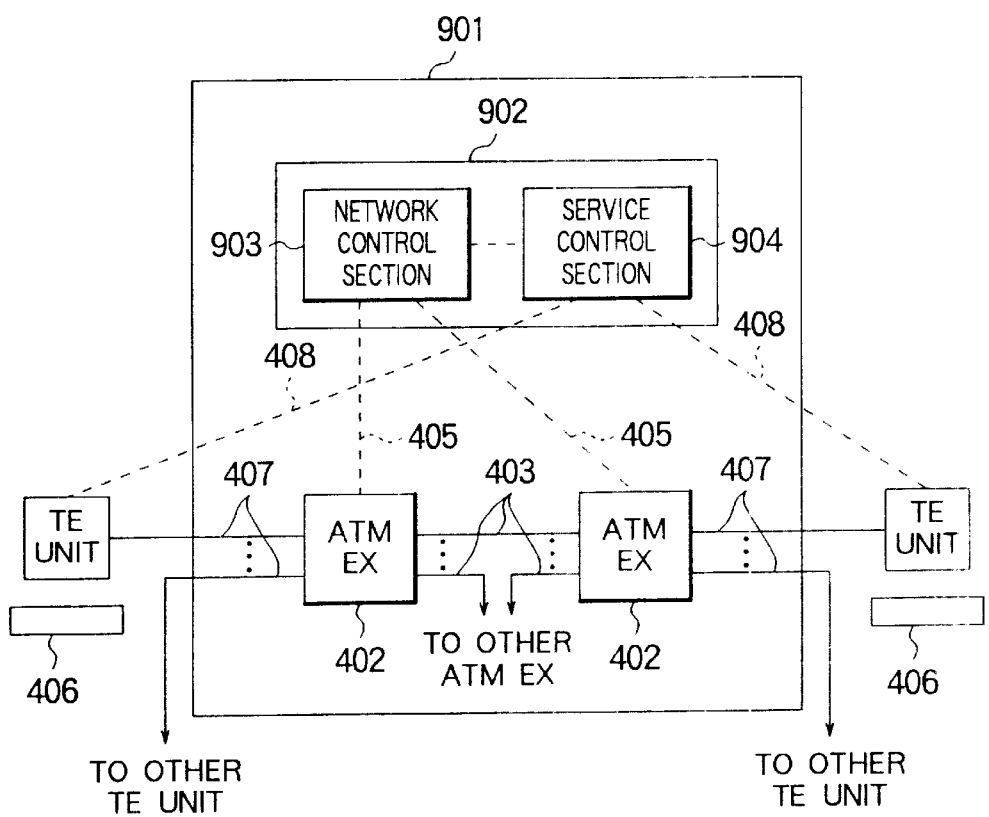
FIG. 9 is a block diagram of an ATM network according to a second embodiment of this invention.

Referring to FIG. 9, description will be made about an ATM network according to a second embodiment of this invention.

In FIG. 9, the ATM network 901 has the same structure as the ATM network 401 illustrated in FIG. 1 without a network controller 902.

The network controller 902 has a network control section 903 which is connected to the ATM exchangers 402 through the logic transmission line circuits 405 and which corresponds to the network controller 404 of FIG. 1. A service control section 904 is connected to the network control section and the terminal equipment units 406 through the logic transmission line circuits 408 to simplify handling of each terminal equipment units 406. Namely, the service control section 904 has a memory (not shown) which memorizes a plurality of the parameters together with service names.

When the terminal equipment unit 406 requests the ATM network to admit the new connection, it produces the call signal which includes one of the service names in place of a combination of the address of the destination terminal equipment unit, the necessary bandwidth of the new connection, and the network class of the new connection. The service name is simpler than the parameter mentioned in conjunction with FIG. 5. The call signal is transmitted to the service control section 904 through the logic transmission line circuit 408.

The service control section 904 receives the call signal including the service name and searches one of the parameters from the memory in response to the service name. The service control section 904 sends the searched parameter to the network control section 903.

The network control section 903 operates like the network controller 404 of FIG. 1 in response to the parameter.

In the case that the terminal equipment unit 406 designates the route of the new connection, data of the optional route may be memorized in the memory of the service control section.

As mentioned above, the handling becomes easy in each of the terminal equipment unit 406, because the service name alone is sent from the terminal equipment unit 406 to access the service control section which memorizes the parameters for admission of the new connection.

What is claimed is:

1. An asynchronous transfer mode network connected to a plurality terminal equipment units, said asynchronous transfer mode network comprising:

a plurality of exchangers, each exchanger connected to at least one of said plurality of terminal equipment units, at least a first exchanger maintaining existing connections and receiving a call signal sent from a first terminal equipment unit, said call signal indicating a request for admission of a connection and including a predetermined parameter representative of a network connection class, said network connection class being classified into a preferential connection class, a normal connection class, and unpreferential connection class; and a network controller connected to said plurality of exchangers and to said plurality of terminal equipment units by logic transmission line circuits, said network controller receiving said call signal from said first exchanger and judging whether or not said requested connection can be admitted in said asynchronous transfer mode network, and network controller;

denying said requested connection when there is insufficient bandwidth in said network and said requested connection is of said normal connection class, denying said requested connection when there is insufficient bandwidth in said network and said requested connection is of said preferential class and said existing connections are only of said normal connection class, ordering said first exchanger to release at least one existing connection that belongs to the unpreferential connection class when said requested connection is of said preferential connection class, and ordering said first exchanger to admit said requested connection in response in the releasing of said at least one existing connection, thereby maintaining any predetermined existing connections of the normal connection class.

2. As asynchronous transfer mode network as claimed in claim 1, wherein said network controller comprises:

physical arrangement memorizing means for memorizing physical arrangement information representative of a physical arrangement of both said exchangers and said terminal equipment units;

existing connection state memorizing means for memorizing existing connection state information which includes routes and priority of existing connections which are being admitted in said asynchronous transfer mode network;

monitoring means connected to said exchangers through said logic transmission line circuits for monitoring operation state of said exchangers;

receiving means connected to said terminal equipment units by said logic transmission line circuits for receiving said call signal to produce a report signal representative or receiving said call signal;

judging means connected to said physical arrangement memorizing means, said existing connection state memorizing means, said monitoring means, and said receiving means for judging whether or not said connection can be admitted in said asynchronous transfer mode network in response to said report signal with reference to said physical arrangement, said existing connection state information, and said operation state to decide a route of said connection and to produce an admission signal when said connection can be admitted in said asynchronous transfer mode network; and ordering means connected to said judging means and said exchanger for ordering one of said exchangers to admit said connection in said route in response to said admission signal.

3. An asynchronous transfer mode network as claimed in claim 1, wherein said network controller further comprises service control means for memorizing said predetermined parameter with parameter name, said call signal including said parameter name in place of said predetermined parameter.

4. A method of processing a requested connection into an asynchronous transfer mode network in response to a call supplied from one of a plurality of terminal equipment units that is connected to one of a plurality of exchangers of said asynchronous transfer mode network, said call signal including a parameter representative of a network connection class which is classified into a preferential connection class, a normal connection class, and an unpreferential connection class, said method comprising the steps of:

memorizing a physical arrangement of said plurality of exchangers and said plurality of terminal equipment units;

memorizing existing connection state information which includes routes and priority of exiting connections which are being admitted in said asynchronous transfer mode network;

monitoring an operation sate of said plurality of exchangers;

receiving said call signal to produce a report signal representative of reception of said call signal;

judging whether or not said requested connection can be admitted in said asynchronous transfer mode network in response to said report signal with reference to said physical arrangement, said existing connection state information, and said operation state to decided a route of said requested connection and to produce an admission signal when said requested connection can be admitted in said asynchronous transfer mode network;

denying said requested connection when there is insufficient bandwidth in said network and said requested connection is of said normal class;

ordering said one of said plurality of exchangers to admit said requested connection in said name of said asynchronous transfer mode network in response to said admission signal;

admitting said requested connection in said asynchronous transfer network in response to said ordering step;

recognizing said network connection class when said requested connection cannot be admitted in said asynchronous transfer mode network;

releasing existing connections which belong to the unpreferential connection class when said network connection class of said requested connection is representative of said preferential connection class and denying said requested connection when there are no existing connections of the unpreferential connection class, thereby maintaining any existing connections of the normal connection class; and admitting said requested connection in said asynchronous transfer mode network in response to said releasing step.

* * * * *